United States Patent Office 3,238,098
Patented Mar. 1, 1966

3,238,098
METHOD OF CONTROLLING SEA LAMPREY
John H. Howell and Everett L. King, Jr., Cheboygan, Mich., assignors to the United States of America as represented by the Secretary of the Interior
No Drawing. Filed Jan. 27, 1964, Ser. No. 340,573
16 Claims. (Cl. 167—46)
(Granted under Title 35, U.S. Code (1952), sec. 266)

The invention herein described and claimed may be used by or for the Government of the United States of America for governmental purposes without the payment of royalties thereon or therefor.

The invention relates to control of the sea lamprey (*Petromyzon marinus*), and more particularly, to chemical treatment of aquatic habitats in which the larval stage of the lamprey lives and grows.

In recent years the lamprey has been a serious threat to food and game fish, particularly in the Great Lakes of North America. Exemplary of the seriousness of the lamprey menace is the virtually complete destruction of the trout harvest from the Great Lakes. In 1946, commercial fishermen took 6,500,000 pounds of trout from Lake Michigan; in 1955 only 34 pounds of trout were taken from that lake as a result of the invasion of the lamprey.

Various means have been employed to destroy or control the lamprey, including chemical means such as described in Patents Nos. 2,821,499 and 3,052,601. Although such chemical means have met with considerable success, chemicals of improved toxicity and selectivity would enable a still more efficient attack on the lamprey, particularly in the larval stages. Selectivity is desirable in order to destroy the lamprey larvae without killing food and game fish, particularly trout.

It is therefore an object of the present invention to provide a larvicide which will effect a substantially complete eradication of larval lampreys in a water course without causing significant harm or mortality of game and food fish.

It has now been found that halo-nitrosalicylanilides, of the type described below, possess outstanding lamprecidal activity, both as to toxicity and selectivity. These compounds have the general formula

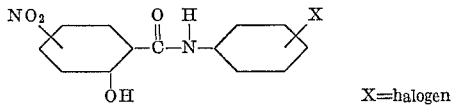

X=halogen and their preparation is described in Patent No. 3,079,-297. Specific examples of the compounds and their lamprecidal activity, either alone or in mixtures, are shown in the examples below.

Concentrations of the chemicals in the water is important since optimum selectivity will generally depend on proper selection of concentration. For example, the use of too high a concentration of chemicals would result in high or total mortality of both lamprey larvae and food or game fish, whereas too small a concentration would be ineffective in killing the lamprey larvae. A trout mortality of about 25% or less may be considered as the limit of tolerance to the killing of fish without substantially harming the fish population of the stream. Optimum concentration of the chemicals in the water will vary considerably with conditions such as temperature, pH of water, types and numbers of food and game fish, numbers of lamprey larvae, etc., and is best determined experimentally by means of laboratory tests simulating conditions of actual proposed use.

The invention will be illustrated by the following examples which show the toxicity and selectivity of the lamprecides of the invention with respect to larval lampreys and rainbow trout. The tests were carried out in 10-liter glass battery jars (10-inch diameter), each containing 6 liters of test solution. The jars were aerated by means of standard stone airbreakers to maintain oxygen levels at near-saturation. Temperatures (55 ° F.) were held constant by immersion of the test jars in a water bath.

Test animals were larvae of the sea lamprey (*Petromyzon marinus*) and fingerling rainbow trout (*Salmo gairdneri*), both ranging from about 3.0 to about 5.0 inches in length. After the animals were tempered and acclimated to the test temperature appropriate amounts of halo-nitrosalicylanilide, in acetone as intermediate solvent, were added to produce the desired concentrations. Other conditions and results are given in the following tables.

TABLE I

Lamprecide: 4'-bromo-3-nitrosalicylanilide

[Water source: Lake Huron. Test period: 24 hours. Water temperature: 55 degrees F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 0.1 | 1 | 2 | 0.0 | 2 | 0.0 |
| 0.3 | 1 | 2 | 100.0 | 2 | 0.0 |
| 0.5 | 1 | 2 | 100.0 | 2 | 0.0 |
| 0.7 | 1 | 2 | 100.0 | 2 | 0.0 |
| 0.9 | 1 | 2 | 100.0 | 2 | 0.0 |
| 1.0 | 1 | 2 | 100.0 | 2 | 50.0 |
| 3.0 | 1 | 2 | 100.0 | 2 | 100.0 |
| 5.0 | 1 | 2 | 100.0 | 2 | 100.0 |
| 7.0 | 1 | 2 | 100.0 | 2 | 100.0 |
| 9.0 | 1 | 2 | 100.0 | 2 | 100.0 |
| 10.0 | 1 | 2 | 100.0 | 2 | 100.0 |

TABLE II

Lamprecide: 2'-chloro-5-nitrosalicylanilide

[Water source: Lake Huron. Test period: 24 hours. Water temperature: 55 degrees F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 0.1 | 1 | 2 | 0.0 | 2 | 0.0 |
| 0.3 | 1 | 2 | 0.0 | 2 | 0.0 |
| 0.5 | 1 | 2 | 0.0 | 2 | 0.0 |
| 0.7 | 1 | 2 | 0.0 | 2 | 0.0 |
| 0.9 | 1 | 2 | 100.0 | 2 | 0.0 |
| 1.0 | 1 | 2 | 100.0 | 2 | 0.0 |
| 3.0 | 1 | 2 | 100.0 | 2 | 0.0 |
| 5.0 | 1 | 2 | 100.0 | 2 | 100.0 |
| 7.0 | 1 | 2 | 100.0 | 2 | 100.0 |
| 9.0 | 1 | 2 | 100.0 | 2 | 100.0 |
| 10.0 | 1 | 2 | 100.0 | 2 | 100.0 |

TABLE III

*Lamprecide: 3'-chloro-5-nitrosalicylanilide*

[Water source: Lake Huron water from tap. Test period: 24 hours. Water temperature: 55 degrees F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 10.0 | 5 | 10 | 70.0 | 10 | 0.0 |
| 15.0 | 5 | 10 | 100.0 | [1] 9 | 44.4 |
| 20.0 | 5 | 10 | 100.0 | 10 | 80.0 |
| Totals | 15 | 30 | | 29 | |

[1] One fish jumped out of jar.

TABLE IV

*Lamprecide: 4'-chloro-5-nitrosalicylanilide*

[Water source: Lake Huron water from tap. Test period: 24 hours. Water temperature: 55 degrees F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 0.1 | 1 | 2 | 0.0 | 2 | 0.0 |
| 0.3 | 1 | 2 | 0.0 | 2 | 0.0 |
| 0.5 | 1 | 2 | 100.0 | 2 | 0.0 |
| 0.7 | 1 | 2 | 100.0 | 2 | 0.0 |
| 0.9 | 1 | 2 | 100.0 | 2 | 0.0 |
| 1.0 | 1 | 2 | 100.0 | 2 | 0.0 |
| 3.0 | 1 | 2 | 100.0 | 2 | 100.0 |
| 5.0 | 1 | 2 | 100.0 | 2 | 100.0 |
| 7.0 | 1 | 2 | 100.0 | 2 | 100.0 |
| 9.0 | 1 | 2 | 100.0 | 2 | 100.0 |
| 10.0 | 1 | 2 | 100.0 | 2 | 100.0 |
| Totals | 11 | 22 | | 22 | |

TABLE V

*Pamprecide: 4'chloro-3-nitrosalicylanilide*

[Water source: Lake Huron water from tap. Test period: 24 hours. Water temperature: 55 degrees F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 0.1 | 1 | 2 | 0.0 | 2 | 0.0 |
| 0.3 | 1 | 2 | 100.0 | 2 | 0.0 |
| 0.5 | 1 | 2 | 100.0 | 2 | 0.0 |
| 0.7 | 1 | 2 | 100.0 | 2 | 0.0 |
| 0.9 | 1 | 2 | 100.0 | 2 | 50.0 |
| 1.0 | 1 | 2 | 100.0 | 2 | 100.0 |
| 3.0 | 1 | 2 | 100.0 | 2 | 100.0 |
| 5.0 | 1 | 2 | 100.0 | 2 | 100.0 |
| 7.0 | 1 | 2 | 100.0 | 2 | 100.0 |
| 9.0 | 1 | 2 | 100.0 | 2 | 100.0 |
| 10.0 | 1 | 2 | 100.0 | 2 | 100.0 |
| Totals | 11 | 22 | | 22 | |

TABLE VI

*Lamprecide: 4'-bromo-5-nitrosalicylanilide*

[Water source: Lake Huron water from tap. Test period: 24 hours. Water temperature: 55 degrees F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 0.1 | 4 | 8 | 0.0 | 8 | 0.0 |
| 0.2 | 4 | 8 | 0.0 | 8 | 0.0 |
| 0.3 | 4 | 8 | 12.5 | 8 | 0.0 |
| 0.5 | 4 | 8 | 100.0 | 8 | 0.0 |
| 0.7 | 4 | 8 | 100.0 | 8 | 0.0 |
| 0.9 | 4 | 8 | 100.0 | 8 | 0.0 |
| 1.0 | 4 | 8 | 100.0 | 8 | 0.0 |
| 1.5 | 4 | 8 | 100.0 | 8 | 87.5 |
| 2.0 | 4 | 8 | 100.0 | 8 | 100.0 |
| 2.5 | 4 | 8 | 100.0 | 8 | 100.0 |
| Totals | 40 | 80 | | 80 | |

TABLE VII

*Lamprecide: 4'-iodo-5-nitrosalicylanilide*

[Water source: Lake Huron water from tap. Test period: 24 hours. Water temperature: 55 degrees F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 0.1 | 4 | 8 | 0.0 | 8 | 0.0 |
| 0.2 | 4 | 8 | 0.0 | 8 | 0.0 |
| 0.3 | 4 | 8 | 0.0 | 8 | 0.0 |
| 0.5 | 4 | 8 | 100.0 | 8 | 0.0 |
| 0.7 | 4 | 8 | 100.0 | 8 | 0.0 |
| 0.9 | 4 | 8 | 100.0 | 8 | 25.0 |
| 1.0 | 4 | 8 | 100.0 | 8 | 12.5 |
| 1.5 | 4 | 8 | 100.0 | 8 | 100.0 |
| 2.0 | 4 | 8 | 100.0 | 8 | 100.0 |
| 2.5 | 4 | 8 | 100.0 | 8 | 100.0 |
| Totals | 40 | 80 | | 80 | |

TABLE VIII

*Lamprecide: 3'-chloro-3-nitrosalicylanilide*

[Water source: Lake Huron. Test period: 24 hours. Water temperature: 55 degrees F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 0.1 | 1 | 2 | 0.0 | 2 | 0.0 |
| 0.3 | 1 | 2 | 100.0 | 2 | 0.0 |
| 0.5 | 1 | 2 | 100.0 | 2 | 0.0 |
| 0.7 | 1 | 2 | 100.0 | 2 | 0.0 |
| 0.9 | 1 | 2 | 100.0 | 2 | 0.0 |
| 1.0 | 1 | 2 | 100.0 | 2 | 0.0 |
| 3.0 | 1 | 2 | 100.0 | 2 | 100.0 |
| 5.0 | 1 | 2 | 100.0 | 2 | 100.0 |
| 7.0 | 1 | 2 | 100.0 | 2 | 100.0 |
| 9.0 | 1 | 2 | 100.0 | 2 | 100.0 |
| 10.0 | 1 | 2 | 100.0 | 2 | 100.0 |

TABLE IX

*Lamprecide: Salcide*

[Water source: Lake Huron water from tap. Test period: 24 hours. Water temperature: 55 degrees F.]

| Concentration in parts per million | Number of tests | Larval lampreys | | Rainbow trout | |
|---|---|---|---|---|---|
| | | Number of test animals | Mortality (percentage of total test animals) | Number of test animals | Mortality (percentage of total test animals) |
| 0.1 | 1 | 2 | 0.0 | 2 | 0.0 |
| 0.3 | 1 | 2 | 50.0 | 2 | 0.0 |
| 0.5 | 1 | 2 | 100.0 | 2 | 0.0 |
| 0.7 | 1 | 2 | 100.0 | 2 | 50.0 |
| 0.9 | 1 | 2 | 100.0 | 2 | 100.0 |
| 1.0 | 1 | 2 | 100.0 | 2 | 50.0 |
| 3.0 | 1 | 2 | 100.0 | 2 | 100.0 |
| 5.0 | 1 | 2 | 100.0 | 2 | 100.0 |
| 7.0 | 1 | 2 | 100.0 | 2 | 100.0 |
| 9.0 | 1 | 2 | 100.0 | 2 | 100.0 |
| 10.0 | 3 | 6 | 100.0 | 6 | 100.0 |
| Totals | 13 | 26 | | 26 | |

The lamprecide employed in the tests described in Table IX was "Salcide," the tradename of a mixture of halo-nitrosalicylanilides from Ben Venue Laboratories, Inc. The mixture comprises 4'-chloro-3-nitrosalicylanilide, 4'-chloro-5-nitrosalicylanilide, 3'-chloro-3-nitrosalicylanilide, and 3'-chloro-5-nitrosalicylanilide.

It will be noted from Table III that the concentration of 3'-chloro-5-nitrosalicylanilide that must be employed for effective lamprecidal activity is greater than with the other isomers. However, it does possess the requisite differential toxicity, and may be employed under special circumstances when this appears desirable.

In addition to employing the halogen substituted nitrosalicylanilides and mixtures thereof as lamprecides as described above, it may be desired to mix these compounds with other known lamprecidal compounds such as, for example, trifluormethyl nitrophenol (described in Great Lakes Fishery Commission, Technical Report No. 1, May 1961 and in Science, vol. 127, page 337, February 14, 1958), 2,5-dichloro-nitrophenols (Patent No. 3,052,601) and O-ethyl-S-pentachlorophenyl-thiolcarbonate (Patent No. 2,821,499).

In treating an aquatic environment or habitat such as a stream according to the method of the invention, the lamprecidal composition may be added directly to the water in the form of a fine powder, with or without suitable wetting or conditioning agents to facilitate dispersal or solution. Alternatively, the compound may be added in liquid form, as solutions, suspensions or emulsions. In general aqueous solutions or dispersions are preferred as the feeding and mixing are more readily effected. These procedures are conventional in the art and are more fully discussed in Patent No. 2,821,499. An intermediate solvent, such as the acetone employed in the examples, may be used to facilitate solution of the lamprecidal composition.

What is claimed is:

1. A method for controlling *Petromyzon marinus* lamprey comprising establishing, in cold water aquatic environments tributary to the Great Lakes of North America containing the *Petromyzon marinus* larvae and habitable by fresh water trout, a concentration of between 0.3 and 15 parts per million of a water-dispersible lamprecidal composition that is lethal to the larvae without more than about twenty-five percent trout mortality, said lamprecidal composition comprising a compound having the formula:

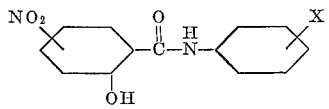

where X is halogen.

2. The method of claim 1 in which the toxic compound is 4'-bromo-3-nitrosalicylanilide.
3. The method of claim 2 wherein the concentration of toxic compound employed is from about 0.3 to about 0.9 p.p.m.
4. The method of claim 1 in which the toxic compound is 2'-chloro-5-nitrosalicylanilide.
5. The method of claim 4 wherein the concentration of toxic compound employed is from about 0.9 to about 3.0 p.p.m.
6. The method of claim 1 in which the toxic compound is 4'-chloro-5-nitrosalicylanilide.
7. The method of claim 6 wherein the concentration of toxic compound is from about 0.5 to about 1.0 p.p.m.
8. The method of claim 1 in which the toxic compound is 4'-chloro-3-nitrosalicylanilide.
9. The method of claim 8 wherein the concentration of toxic compound is from about 0.3 to about 0.7 p.p.m.
10. The method of claim 1 in which the toxic compound is 4'-bromo-5-nitrosalicylanilide.
11. The method of claim 10 wherein the concentration of toxic compound is from about 0.5 to about 1.0 p.p.m.
12. The method of claim 1 in which the toxic compound is 4'-iodo-5-nitrosalicylanilide.
13. The method of claim 12 wherein the concentration of toxic compound is from about 0.5 to about 1.0 p.p.m.
14. The method of claim 1 in which the toxic compound is 3'-chloro-3-nitrosalicylanilide.
15. The method of claim 14 wherein the concentration of toxic compound is from about 0.3 to about 1.0 p.p.m.
16. A method for controlling *Petromyzon marinus* lamprey which inhabit the Great Lakes of North America and waters tributary thereto which comprises, establishing in aquatic environments containing the *Petromyzon marinus* larvae and habitable by fresh water trout, a concentration between about 0.3 and 15 parts per million of a water-dispersible lamprecidal composition that is lethal to the larvae without more than twenty-five percent trout mortality, said lamprecidal composition comprising a compound having the formula:

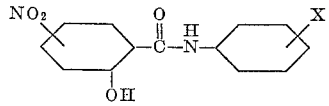

where X is halogen.

References Cited by the Examiner

UNITED STATES PATENTS

| 3,079,297 | 2/1963 | Schraufstatter | 167—31 |
| 3,113,067 | 12/1963 | Strufe et al. | 167—30 |
| 3,147,300 | 9/1964 | Schraufstatter | 260—479 |

OTHER REFERENCES

Goennert et al.: "A New Molluscicide: Molluscicide Bayer 73," Anais, Inst, Med. Trop. Suppl. (Lisbon) 16: 197–202 (1959) (in English); Abstracted in Chem. Abstracts 59 2118c (1963).

Schraufstatter: "A New Molluscicide: I. Relations Between Structure and Activity" Z. Natursforch 16 B: 95–108 (1961), abstracted in English in Chem. Abstracts 56 4661B–4663D (1962).

Schraufstatter: "Chemical Development of Bayluscide," Pflanzenschutz-Nachr." "Bayer" 15 (1): 25–41 (1962).

Shiff: "Trials with a New Molluscicide, Bayer 73, in Southern Rhodesia," Bull W.H.O. 25, 533–542 (1961).

Shiff: "The Short-Term Effects of Three Molluscicides on the Microflora and Microfauna of Small, Biologically Stable Ponds in Southern Rhodesia," Bull W.H.O. 25, 543–547 (1961).

Webbe: "Laboratory and Field Trials of a New Molluscicide, Bayer 73, in Tanganyika," Bull. W.H.O. 25, 525–531 (1961).

LEWIS GOTTS, *Primary Examiner.*

SHEP K. ROSE, *Assistant Examiner.*

Notice of Adverse Decision in Interference

In Interference No. 95,664 involving Patent No. 3,238,098, J. H. Howell and E. L. King, Jr., METHOD OF CONTROLLING SEA LAMPREY, final judgment adverse to the patentees was rendered Mar. 26, 1969, as to claims 1–16.
[*Official Gazette March 17, 1970.*]